United States Patent
Bales et al.

[11] Patent Number: 5,828,652
[45] Date of Patent: Oct. 27, 1998

[54] ESTABLISHMENT OF A FLEXIBLE RATE INTERFACE LINK TO RESTORE CHANNELS FROM A FAILED COMMUNICATION LINK

[75] Inventors: Bruce M. Bales, Louisville; Robert L. Crumpley, Westminster; Sandra S. North, Berthoud; Stephen M. Thieler, Boulder, all of Colo.

[73] Assignee: Lucent Technologies, Inc., Murray Hill, N.J.

[21] Appl. No.: 722,715

[22] Filed: Sep. 30, 1996

[51] Int. Cl.$^6$ .............................. H04J 3/12; H04M 11/00
[52] U.S. Cl. ............................ 370/225; 370/524; 379/221
[58] Field of Search ...................................... 370/216, 217, 370/218, 225, 228, 264, 389, 400, 409, 410, 420, 438, 465, 469, 522, 524; 3430/825.01, 825.03, 826, 827; 379/93.01, 93.14, 201, 219, 221, 271, 272, 273, 220

[56] References Cited

U.S. PATENT DOCUMENTS

| | | | |
|---|---|---|---|
| 4,993,014 | 2/1991 | Gordon | 370/225 |
| 5,014,266 | 5/1991 | Bales et al. | 370/522 |
| 5,142,525 | 8/1992 | Nakatsuma | 370/524 |
| 5,159,594 | 10/1992 | Bales et al. | 370/409 |
| 5,182,750 | 1/1993 | Bales et al. | 370/221 |
| 5,182,751 | 1/1993 | Bales et al. | 370/524 |
| 5,386,466 | 1/1995 | Bales et al. | 379/220 |
| 5,390,242 | 2/1995 | Bales et al. | 379/221 |
| 5,463,629 | 10/1995 | Ko | 370/524 |

*Primary Examiner*—Alpus H. Hsu
*Attorney, Agent, or Firm*—John C. Moran

[57] ABSTRACT

In a telecommunication switching system having a plurality of switch nodes with each of the switch nodes responsive to a failure of a communication link within a group of communication links to establish a flexible rate interface (FRI) link upon there being no spare channels within the group of communication links and to switch active calls from the channels of the failed communication link to the channels of the newly established FRI link. Advantageously, the group of communication links can be a non-facility access service (NFAS) group. Advantageously, this allows for additional B channels to be added to the NFAS group even though there are no remaining physical communication links between the two switch nodes being interconnected by the NFAS group. The establishment of the FRI link allows for the addition of B channels to the NFAS group with these B channels being routed through other switch nodes of the communication switching system. The FRI link becomes part of the NFAS group and control is provided for the B channels of the FRI link by the primary D channel of the NFAS group. Advantageously, the FRI link can be set up through other communication facilities other than the communication switching system. For example, if the two switch nodes interconnected by the NFAS group are both connected to the public telephone network, the FRI link can be set up through the public telephone network.

16 Claims, 5 Drawing Sheets

ESTABLISHMENT OF A FLEXIBLE RATE INTERFACE LINK TO RESTORE CHANNELS FROM A FAILED COMMUNICATION LINK

TECHNICAL FIELD

This invention relates to a communication switching system having a plurality of switching nodes, and, in particular, to the restoration of active communication channels of a failed communication link.

BACKGROUND OF THE INVENTION

In prior art switching systems comprising a plurality of identical switching nodes, an originating switching node must set up each individual call to a destination switching node via an intervening switching node by involving the intervening switching node in each call control operation such as initiation, progress and termination of calls. One problem with such architecture is that the intervening switching node is substantially performing the same amount of call processing work as the originating switching node and the designation switching node; consequently, the number of calls that can be handled by the intervening switching node is limited. The effect of this problem is intensified if more than one intervening switching node is between the originating switching node and designation switching node. Because of this problem, the prior art architecture of switching systems has not been able to utilize networks of identical switching nodes efficiently, but has been limited to switching nodes interconnected via special purpose hardware (either special purpose switching nodes, e.g., No. 4 ESS, or special center stage switching units, e.g., No. 5 ESS or AT&T Definity Telecommunication Switching System).

U.S. Pat. No. 5,182,751 resolves the above problems by disclosing a flexible rate interface (FRI) link. The FRI link is established on a standard ISDN link which is terminated on an ISDN interface connected to a switching node. On the standard ISDN link, the signaling channel is communicated in a D channel of a standard ISDN link, and the transport channels are B channels of a standard ISDN link. A processor controlling the switching node sets up a FRI signaling channel on the standard ISDN link for use by the FRI link and establishes the ISDN standard protocol on that FRI signaling channel. The FRI signaling channel of the FRI link may be established by using any of the following: a B channel of a standard ISDN link, standard ISDN user information transport facilities, or a logical link of a D channel of a standard ISDN link. Also, B channels from the standard ISDN link are reserved for use with the FRI link as virtual transport channels. The processor utilizes the FRI link and the standard ISDN link as two distinct links. The processor communicates signaling information on the FRI signaling channel to perform all call control on calls being set up or active on the transport channels assigned to the FRI link. The signaling information communicated on the FRI signaling channel is distinct from the signaling information of the signaling channel of the ISDN link which controls all calls on the unassigned transport channels of the ISDN link. Only the endpoint switching nodes are aware of the existence of the FRI link with respect to call control.

In prior art telecommunications switching systems comprising a plurality of stored program controlled switch nodes, it is well known that when two switch nodes are interconnected by a plurality of PRI links, to form these PRI links to a non-facility access service (NFAS) group. All active PRI links are part of the NFAS group. Within a NFAS group of PRI links, the D channels (which are normally used for signaling) in all but two of the PRI links are utilized as an additional B (bearer) channel. In the two remaining PRI links, one D channel is designated as the primary D channel, and the D channel of the second remaining PRI link is designated as the secondary D channel. In accordance with CCITT specifications, if the primary D channel is lost, then, the two switching nodes will utilize the secondary D channel for signaling. In accordance with the CCITT specification, if a PRI link is lost no attempt is made to preserve the calls on B channels of the failed PRI link by moving them to B channels of other PRI links within the NFAS group or to set up new links. This results in calls being lost even though there is spare capacity within the NFAS group to continue these calls.

There are a number of reasons why the primary PRI link may be disabled. One reason is that the primary PRI link is a wired link that has been cut accidentally. A second reason is that in a highly distributed system such as illustrated in U.S. Pat. No. 5,182,751 it is necessary to add and remove PRI links interconnecting switch nodes. At present, if calls are not to be terminated, it is necessary to wait until there are no calls being communicated on any of the links making up the NFAS group. This is often done by indicating that each of the links is out of service. In general, this requires field personnel to work during the early morning hours when there is little activity on the system.

It is clear that a problem exists in the art with the present procedure of simply dropping calls on B channels of a failed PRI link even if there are no idle B channels within the NFAS group. As noted in the previous paragraph, there are a variety of conditions under which such failures can happen on a routine basis, and it is not desirable to loose routinely lose calls.

SUMMARY OF THE INVENTION

The foregoing problems are solved, and a technical advance is achieved by an apparatus and method in a telecommunication switching system having a plurality of switch nodes with each of the switch nodes responsive to a failure of a communication link within a group of communication links to establish a flexible rate interface (FRI) link upon there being no spare channels within the group of communication links and to switch active calls from the channels of the failed communication link to the channels of the newly established FRI link. Advantageously, the group of communication links can be a non-facility access service (NFAS) group. Advantageously, this allows for additional B channels to be added to the NFAS group even though there are no remaining physical communication links between the two switch nodes being interconnected by the NFAS group. The establishment of the FRI link allows for the addition of B channels to the NFAS group with these B channels being routed through other switch nodes of the communication switching system. The FRI link becomes part of the NFAS group and control is provided for the B channels of the FRI link by the primary D channel of the NFAS group. Advantageously, the FRI link can be set up through other communication facilities other than the communication switching system. For example, if the two switch nodes interconnected by the NFAS group are both connected to the public telephone network, the FRI link can be set up through the public telephone network.

Other and further aspects of the present invention will become apparent during the course of the following description and by reference to the accompanying drawing.

DETAILED DESCRIPTION

Figure 1:
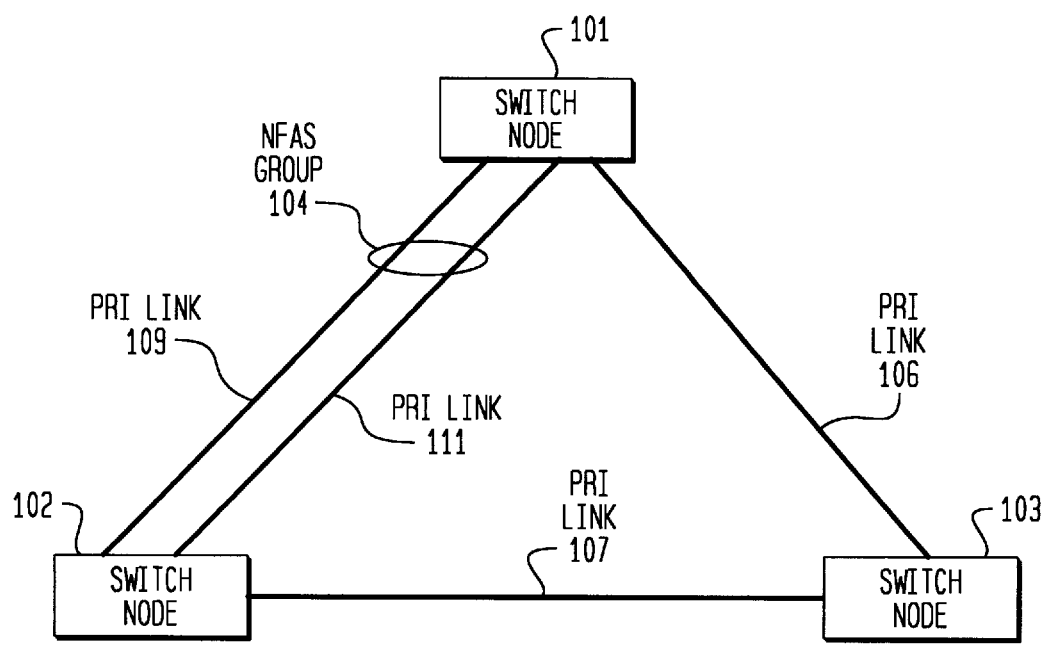
FIG. 1 illustrates, in block diagram form, a telecommunication switching system embodying the inventive concept.

FIG. 1 shows a telecommunication switching system having a plurality of switch nodes 101, 102, and 103. The switch nodes of FIG. 1 function as an integrated system to provide telecommunication services. Switch nodes 101 and 102 are interconnected by NFAS group 104 that includes PRI link 109 and PRI link 111. PRI links 109 and 111 can also be BRI links or NFAS group 104 can be a combination of BRI and PRI links. One skilled in the art could readily envision other types of communication links being used. In addition, switch node 101 is interconnected to switch node 103 via PRI link 106, and switch node 102 is interconnected to switch node 103 via PRI link 107. The switch nodes of FIG. 1 are arranged in a node hierarchy with switch node 101 being the highest switch node of the node hierarchy. The manner in which the node hierarchy initialization and dialing plan initiationization are performed is described in detail in U.S. Pat. No. 5,386,466.

Each PRI link in NFAS group 104 comprises 24 channels. If a PRI link is utilized by itself, then the 24 channels of the PRI link are designated as follows: channel 24 is designated as the signaling channel/D channel and is utilized to handle the ISDN messages which are exchanged by the switch nodes. In addition, data calls can be set up on other logical links of the D channel. The remaining 23 channels are designated as B channels and can be utilized for voice or data information. Within a NFAS group, one of the PRI links is designated to carry the primary D channel, such as PRI link 109, and a second PRI link is designated to carry the secondary D channel, such as PRI link 111. In both the primary and secondary PRI link, one of the 24 channels is designated as the D channel and the remaining 23 channels can be utilized for communicating voice or data information. In any additional PRI links, in the NFAS group, all 24 channels are utilized for the communication of voice and data information.

In accordance with the prior art which is the ISDN specification, if PRI link 111 fails, switch nodes 101 and 102 abandon the active calls that were being communicated on B channels of PRI link 111. The U.S. patent application entitled "ISDN B Channel and Data Link Automatic Restoration", filed the same day as the present application, and assigned to the same assignee as the present application, discloses the following. If there are idle B channels in PRI link 109, switch nodes 101 and 102 transfer the active calls from the failed PRI link 111 to the idle B channels on PRI link 109. In accordance with the invention of the present application, if there are no idle channels in PRI link 109, switch nodes 101 and 102 establish a FRI link via switch node 103 over PRI links 106 and 107. The active calls on the failed PRI link 111 are transferred to the B channels of the FRI link. Note, that normally switch nodes 101 and 102 would be connected to switch node 103 via NFAS groups and there would be multiple PRI links in each NFAS group. Only one interconnecting PRI link is shown between switch nodes 101 and 102 and switch node 103 for simplicity of description.

Figure 2:
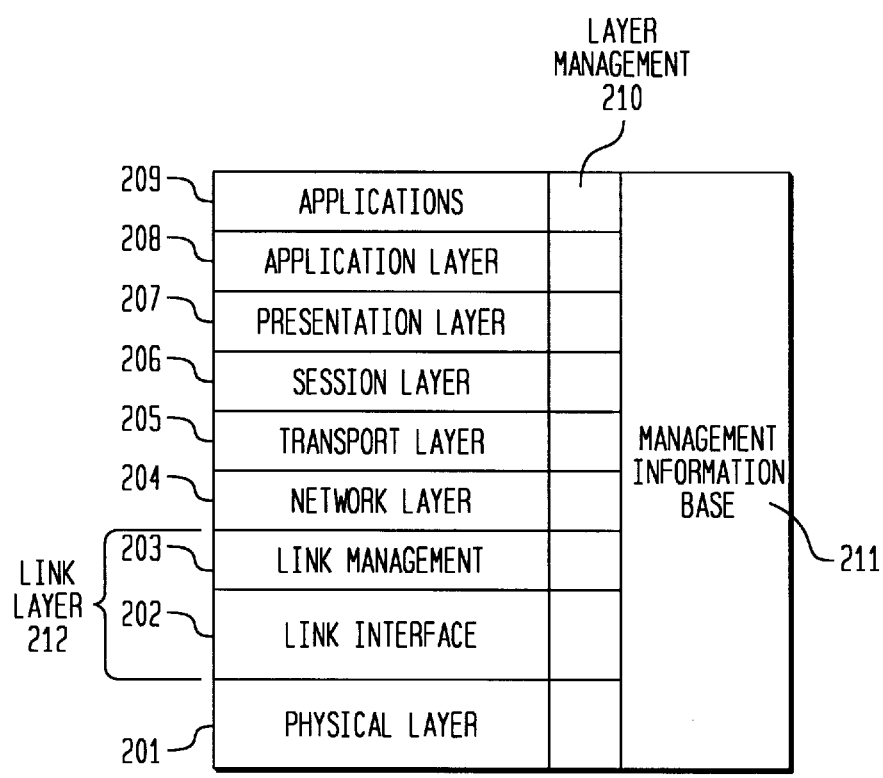
FIG. 2 illustrates a software architecture in accordance with the invention.

FIG. 2 illustrates the software architecture of the switch nodes of FIG. 1. This architecture is based on the conventional OSI model modified to implement the ISDN protocol. Further modifications have been made to this model to incorporate the invention. Software layers 205 through 209 are described in U.S. Pat. No. 5,386,466.

The principal function of physical layer 201 is to terminate physical links. Specifically, physical layer 201 is responsive for maintaining physical channels and for controlling physical sub-channels thereon. Physical layer 201 comprises a software portion and physical interfaces Further, the software portion of physical layer 201 is responsible for the direct control of the physical interface to which physical links communicate PRI and BRI information terminate. Physical layer 201 presents to link layer 212 physical sub-channels and physical channel as entities controllable by link layer 212. Since physical layer 201 is terminating the physical links, physical layer 201 determines when a D channel of the primary PRI link of a NFAS group has failed because of the lost of framing on the channels of the D channel.

The primary function of link layer 212 is to assure that the information transmitted over a physical channel is recovered intact and in the correct order. This is accomplished using another layer of protocol (referred to as the physical packet protocol) which allows multiple communications paths—commonly referred to as logical links—to be established on a given physical channel or a physical sub-channel communicating packetized data. These logical links are used to identify and process data being communicated between layer 212 and physical layer 201. In ISDN Q.921, the protocol used is the LAPD packet protocol. Further, link layer 212 allows higher software layers to control physical layer 201 in an abstract manner. Link layer 212 uses a first layer of software protocol.

As seen in FIG. 2, link layer 212 is divided into link interface 202 and link management 203. The reason for this division is set forth herein below. It will be helpful at this point to discuss the communication of ISDN signals over a D channel to help readers who have only a rudimentary knowledge of the communication of ISDN signals over a D channel. At link layer 212, a plurality of logical links is established on a D channel. Only one of these logical links communicates ISDN control signals, and this logical link is referred to as a logical D channel (LDC). The LDC is identified by a logical D channel number (LDCN).

Link interface 202 does the majority of the functions performed by link layer 212, including the establishment of logical links. Link management 203 identifies the various link interfaces for higher software layers. Further, link management 203 communicates information between the logical links and higher software layers. In addition, link management 403 is responsive to a signal from physical layer 201 indicating that the primary D channel has lost framing to switch to the D channel of the secondary PRI link of a NFAS group.

Network layer 204 processes information communicated on the LDCs and terminates the ISDN Q.931 protocol. Hence, this layer is responsible for negotiating the utilization of system resources for the termination or origination of calls external to a switching node. The network layer controls the allocation of channels on an interface on which a call is being received or set up. In addition, network layer 204 determines the primary and secondary D channels of a NFAS group. For example, if switch node 102 receives a call from switch node 101 via PRI link 111, network layer 204 of switch node 102 negotiates with its peer layer (the corresponding network layer 204 in switch node 101) in order to obtain allocation of a D channel in PRI link 111. This negotiation is carried out using standard ISDN Q.931 messages such as the call setup message via the LDC setup on the D channel of PRI link 109 (assuming that this is the primary PRI link of NFAS group 104). Greater detail on the manner in which network software layer 204 functions with respect to setting up calls is set forth in U.S. Pat. No. 5,386,466.

Figure 3:
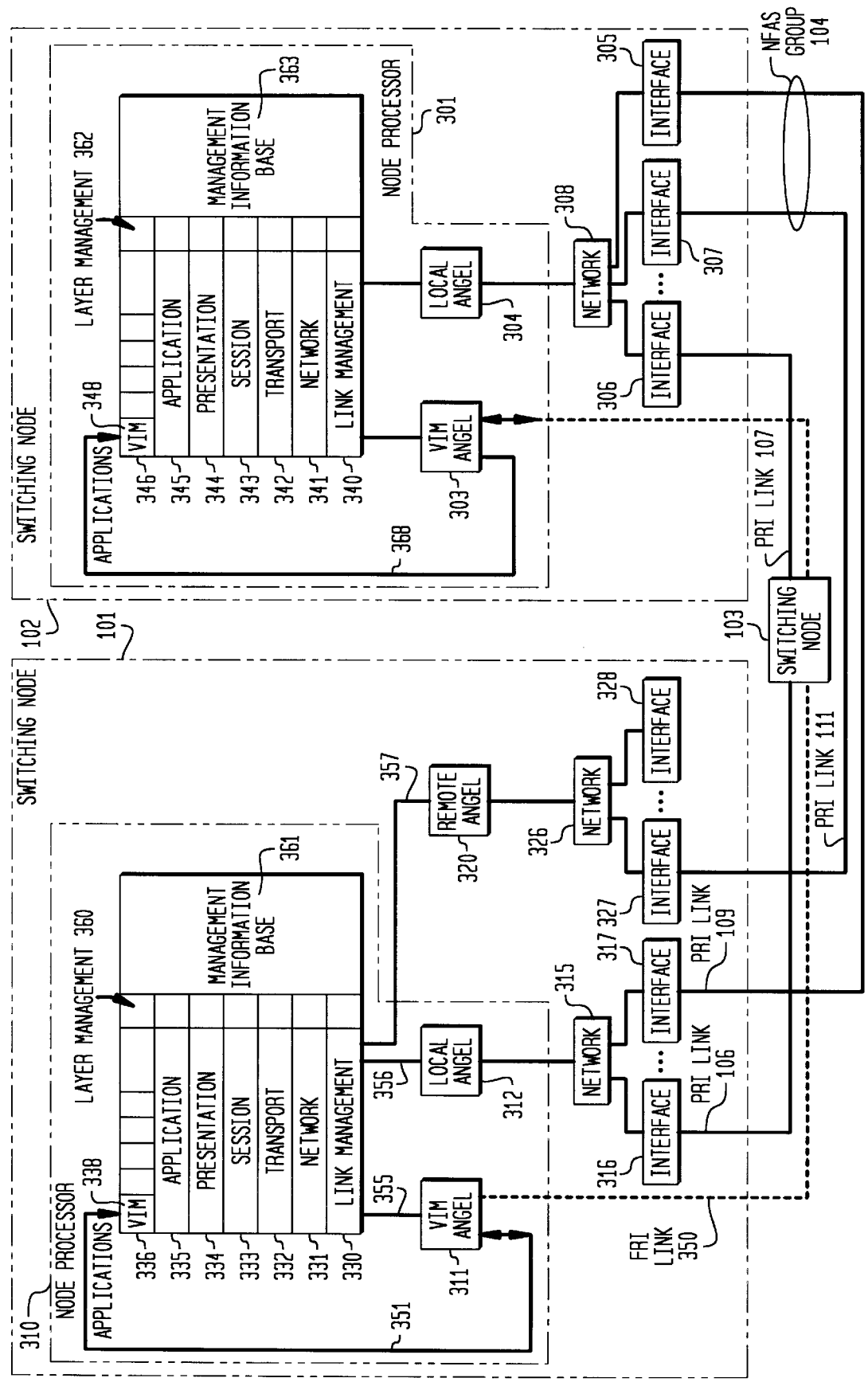
FIG. 3 illustrates, in block diagram form, greater detail to switch nodes of the telecommunication switching system of FIG. 1.

FIG. 3 illustrates, in block diagram form, the software architecture of FIG. 2 as implemented in switch nodes 101 and 102. Software layers 203 through 209 are implemented on the main processor of switch nodes 101 and 102 which is node processors 310 and 301, respectively. Specifically, the software layers down through the link management portion of the link layer are realized by software layers denoted as 330 through 336 in node processor 310 and 340 through 346 in node processor 301. The link interface portion of the link layer is implemented by remote angel 320 and software modules in processor 310 designated as local angel 302 and VIM angel 311. In processor 301, the link interface portion is implemented as software modules designated as local angel 304 and VIM angel 303.

The physical layer is jointly implemented by hardware and software. Specifically, the hardware portion of the physical layer for switch node 101 is implemented by interfaces 316 through 317 and interfaces 327 through 328. The software portion of the physical layer is performed by local angel 302 and remote angel 320. The hardware portion of the physical layer for switch 102 is implemented by interfaces 305 through 307. The software portion of the physical layer is performed by local angel 304.

Consider now the previous example in greater detail. When PRI link 111 fails, this failure is detected by the physical layers in both switch nodes 101 and 102. The physical layers report this to the link layers in both switch nodes. The link layers are responsive to the loss of PRI link 111 to send to the interface managers of the network layers in both switch nodes a MPH_DEACTIVATE indication that reports a channel is gone. This indication is transmitted for each active channel that is lost in PRI link 111. Since switch node 101 is the highest switch node of the node hierarchy, switch node 101 is considered to be the network switch node and the interface manager at network layer 331 responds to the indication. Further information on the significance of the network switch node is set forth in U.S. Pat. No. 5,386,466. As described in the previously referenced copending application, if there are idle channels within NFAS group 104, network layer 331 communicates with network layer 341 to transfer the active B channels in failed PRI link 111 to the idle B channels of PRI link 109. In accordance with the present invention, if there are not enough idle B channels in PRI link 109, network layer 331 requests that VIM angel 311 establish a FRI link. VIM angel 311 relays this request to VIM application 338. In the present example, VIM application 338 establishes FRI link 350 via PRI link 106, switching node 103, and PRI link 107. The manner in which FRI link 350 is established by VIM application 338, VIM angel 311, VIM application 348, and VIM angel 303 is set forth in detail in U.S. Pat. No. 5,182,751. Advantageously, FRI link 350 is established with 23 B channels. One skilled in the art could readily envision that FRI link 350 could be established with a different number of B channels. When FRI link 350 becomes active, network layer 341 is responsive to a L3_DL establish indication for FRI link 350 from link management layer 330 to commence the transfer of the active calls from failed PRI link 111 to FRI link 350. The L3_DL establish indication is generated when the new FRI link becomes active. When network layer 331 requests that VIM application 338 establish the FRI link, network layer 331 supplies information indicating that the FRI link is to be connected to switching node 102. In addition, network layers 331 and 341 add FRI link 350 to NFAS group 104. Network layers 331 and 341 add FRI link 350 to NFAS group 104 automatically upon receiving the L3_DL establish indication. If at a later point in time, another PRI link fails and there is insufficient idle channels in NFAS group 104, the previously described procedure will be once again performed, and another FRI link will be established and added to NFAS group 104.

Figure 4:
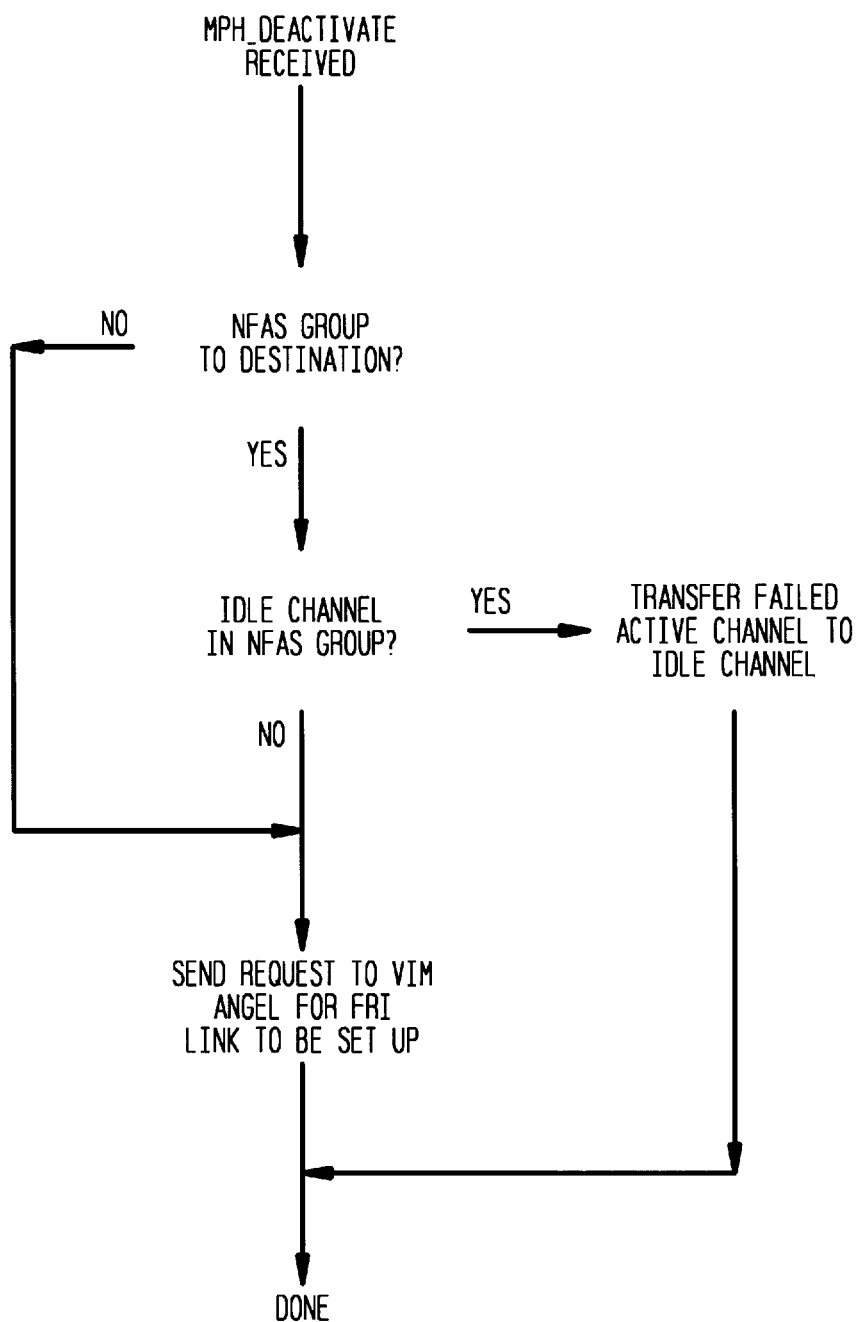
FIG. 4 illustrates, in flow chart form, greater details of the operations performed when an indication is received that a active channel has failed.
Figure 5:
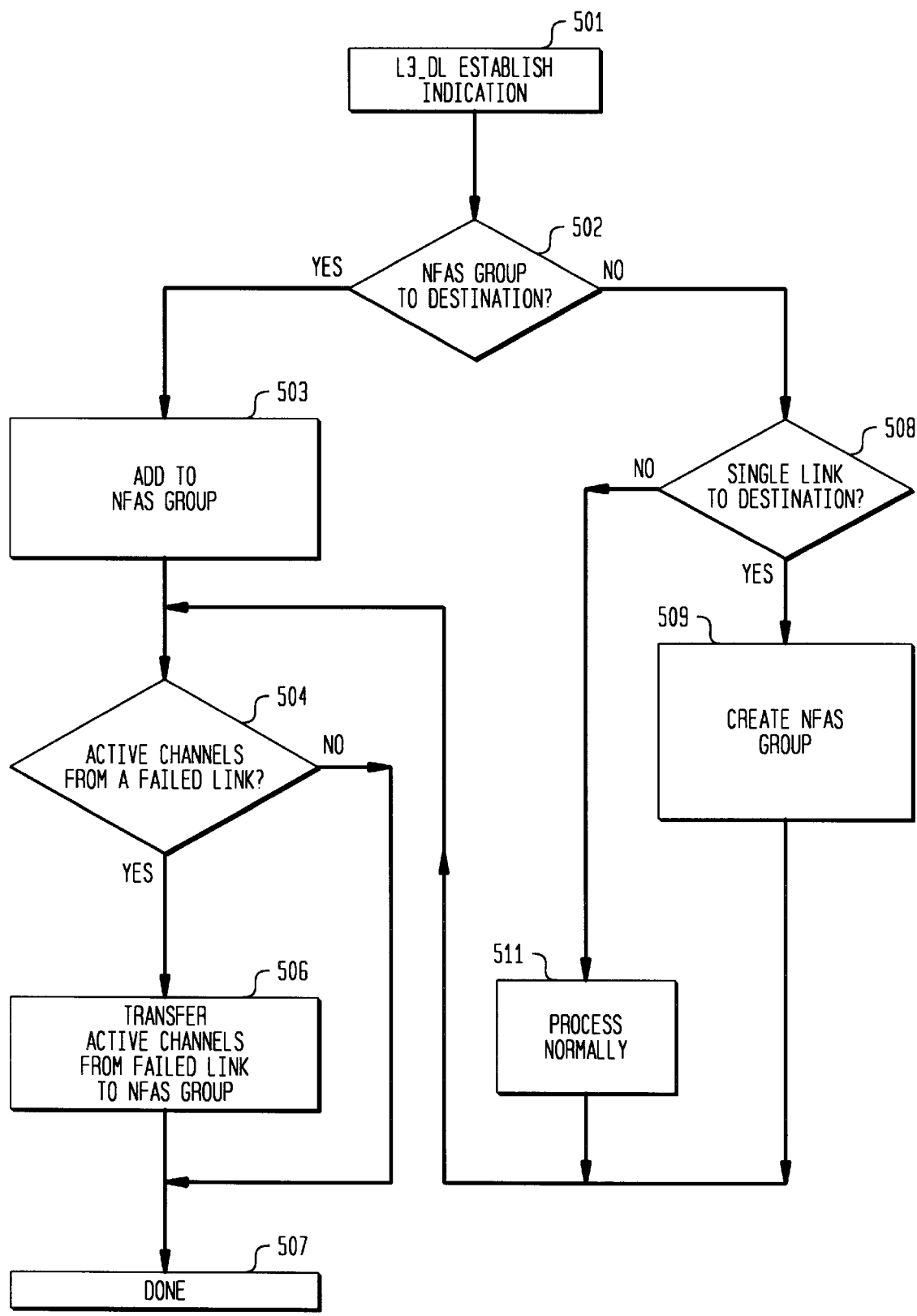
FIG. 5 illustrates, in flow chart form, greater details of the operations performed when an indication is received that a new link has been established.

FIG. 4 illustrates the steps performed by a network layer when a indication is received from the link management layer that a active channel has been lost. Block 401 shows that the process is initiated by receipt of a MPH_DEACTIVATE. Decision block 402 determines if there is a NFAS group to the destination to which the active channel had been connected. If the answer is no, control is transferred to block 404. If the answer is yes, decision block 403 determines if there is an idle channel in the NFAS group. If the answer is no, control is transferred to block 404 which sends a request to the VIM angel for a FRI link to be set up. FIG. 5 describes the action taken when the FRI link is established. After execution of block 404, control is transferred to block 407 and the process is terminated.

Returning to decision block 403, if the answer is yes, that there is an idle channel within the NFAS group, control is transferred to block 406 which transfers the failed active channel to an idle channel of the NFAS group. After execution of block 406, control is transferred to block 407.

FIG. 5 illustrates the steps performed by a network layer upon being informed that a new link has been established to a destination. The process is started by receipt of a L3_DL establish indication. Upon receipt of this indication, decision block 502 determines if there is already NFAS group to the destination. If the answer is no, control is transferred to decision block 508 which determines if there is a single link to the destination. If the answer in decision block 508 is no, control is transferred to block 511, and the initialization of the link is handled in a normal manner. After execution of block 511, control is transferred to block 504. The actions performed by blocks 504, 506, and 507 are described in the next paragraph. If the answer in decision block 508 is yes, block 509 creates a NFAS group before transferring control to block 504.

Returning to decision block 502, if there already is a NFAS group to the destination, control is transferred to block 503 which adds the new link to the established NFAS group before transferring control to decision block 504. Decision block 504 determines if there are any active channels from a failed link which have not yet timed out. If the answer is no in decision block 504, control is transferred to block 507, and the process is terminated. If the answer is yes in decision block 504, block 506 proceeds to transfer each of the active channels from the failed group to the idle channels of the NFAS group before transferring control to block 507. There are now idle channels in the NFAS group that resulted from the idle channels of the newly established link to the destination.

The invention claimed is:

1. A method of preserving active transport channels within a non-facility access service (NFAS) group of communication links interconnecting two of a plurality of switch nodes of a telecommunication switching system wherein all signaling messages for the NFAS group of communication links are communicated via one of the communication links of the NFAS group of communication links via a signaling channel, comprising the steps of:

detecting a failure of one communication link in the NFAS group of communication links that has active transport channels;

determining that no idle transport channels are present within the NFAS group of communication links;

establishing a virtual communication link having virtual transport channels interconnecting the two of the plurality of switch nodes via physical transport channels through other ones of the plurality of switch nodes upon the determination that no idle transport channels are present within the NFAS group of communication links;

adding the virtual communication link to the NFAS group of communication links;

communicating signaling messages for control of the virtual communication link via the signaling channel of the NFAS group of communication links; and transferring each of the active transport channels of the failed communication link in the NFAS group of communication links to the virtual transport channels of the virtual communication link.

2. The method of claim 1 wherein each of the switch nodes executes a plurality of software layers with the software layers being arranged in a hierarchical structure and the steps of detecting a failure, determining idle channels, and transferring each of the active channels are performed by a lower software layer of the plurality of software layers.

3. The method of claim 2 wherein the step of establishing comprises the steps of requesting by the lower software layer that a lowest one of the plurality of software layers establish the virtual communication link; and sending a message by the lowest one of the plurality of software layers to the highest one of the plurality of software layers to establish the virtual communication link.

4. The method of claim 1 wherein the two of the plurality switch nodes are interconnected to another telecommunication switching system and the step of establishing further establishes the virtual communication link via the other telecommunication switching system.

5. The method of claim 4 wherein the NFAS group of communication links comprises ISDN PRI links.

6. The method of claim 4 wherein the NFAS group of communication links comprises ISDN BRI links.

7. The method of claim 6 wherein the active channels are communicating audio information.

8. The method of claim 6 wherein the active channels are communicating data information.

9. A telecommunication switching system having two of a plurality of switch nodes interconnected by a non-facility access service (NFAS) group of communication links wherein all signaling messages for the NFAS group of communication links are communicated via one of the communication links of the NFAS group of communication links via a signaling channel, each of the two of plurality of switch nodes comprising:

means for detecting a failure of one communication link in the NFAS group of communication links that has active transport channels;

means for determining that no idle transport channels are present within the NFAS group of communication links;

means for establishing a virtual communication link having virtual transport channels interconnecting the two of the plurality of switch nodes via physical transport channels through other ones of the plurality of switch nodes;

means for adding the virtual communication link to the NFAS group of communication links;

means for communicating signaling messages to control the virtual communication link via the signaling channel of the NFAS group of communication links; and means for transferring each of the active transport channels of the failed communication link in the NFAS group of communication links to the virtual transport channels of the virtual communication link thereby preserving the active transport channels of the failed communication link.

10. The telecommunication switching system of claim 9 wherein each of the switch nodes executes a plurality of software layers with the software layers being arranged in a hierarchical structure and the means for detecting a failure, the means for determining idle channels, and the means for transferring each of the active channels are performed by a lower software layer of the plurality of software layers.

11. The telecommunication switching system of claim 10 wherein the means for establishing comprises means for requesting by the lower software layer that a lowest one of the plurality of software layers establish the virtual communication link; and means for sending a message by the lowest one of the plurality of software layers to the highest one of the plurality of software layers to establish the virtual communication link.

12. The telecommunication switching system of claim 9 wherein the two of the plurality switch nodes are interconnected to another telecommunication switching system and the means for establishing further establishes the virtual communication link via the other telecommunication switching system.

13. The telecommunication switching system of claim 12 wherein the NFAS group of communication links comprises ISDN PRI links.

14. The telecommunication switching system of claim 12 wherein the NFAS group of communication links comprises ISDN BRI links.

15. The telecommunication switching system of claim 14 wherein the active channels are communicating audio information.

16. The telecommunication switching system of claim 14 wherein the active channels are communicating data information.

* * * * *